US006564203B1

United States Patent
Krishnaprasad et al.

(10) Patent No.: US 6,564,203 B1
(45) Date of Patent: May 13, 2003

(54) DEFINING INSTEAD-OF TRIGGERS OVER NESTED COLLECTION COLUMNS OF VIEWS

(75) Inventors: Muralidhar Krishnaprasad, Foster City, CA (US); Vishwanathan Krishnamurthy, Fremont, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/513,724

(22) Filed: Feb. 24, 2000

(51) Int. Cl.[7] .............................................. G06F 17/30
(52) U.S. Cl. ................................ 707/2; 707/1; 707/10; 707/100; 707/101; 707/102
(58) Field of Search .................... 707/1–10, 100–104.1

(56) References Cited

U.S. PATENT DOCUMENTS

| | | | |
|---|---|---|---|
| 5,379,419 A | * 1/1995 | Heffernan et al. | 707/4 |
| 5,564,047 A | * 10/1996 | Bloem et al. | 707/100 |
| 5,572,673 A | * 11/1996 | Shurts | 707/200 |
| 5,680,602 A | * 10/1997 | Bloem et al. | 707/1 |
| 5,797,136 A | * 8/1998 | Boyer et al. | 707/2 |
| 5,875,334 A | * 2/1999 | Chow et al. | 717/141 |
| 5,926,819 A | * 7/1999 | Doo et al. | 707/100 |
| 5,950,173 A | * 9/1999 | Perkowski | 235/375 |
| 6,006,214 A | * 12/1999 | Carey et al. | 707/2 |
| 6,018,664 A | * 1/2000 | Skarin | 455/453 |
| 6,108,664 A | * 8/2000 | Nori et al. | 707/103 R |
| 6,212,514 B1 | * 4/2001 | Eberhard et al. | 707/2 |

OTHER PUBLICATIONS

Peter A. Bonez, Martin L. Kersten, Nov. 10, 1998, The VLDB Journal, pp. 101–119.*
Andy Yao, "Introduction to Oracle SQL and PL/SQL", 1998, pp. 33–36.*

* cited by examiner

Primary Examiner—Greta Robinson
Assistant Examiner—Linh Black
(74) Attorney, Agent, or Firm—Hickman Palermo Truong & Becker LLP; Brian D. Hickman; John D. Henkhaus

(57) ABSTRACT

Techniques are provided for updating data that logically resides in one or more nested collections in a nested collection column of a view. According to one technique, a Data Manipulation Language (DML) statement that operates on individual elements within the one or more nested collections is detected. Instead of executing the DML statement, trigger code is executed once for each individual element, within the one or more nested collections, that is targeted by the DML statement. In addition, the trigger code may include one or more references to parent values. For each nested collection selected by the DML statement, the following steps are performed when the trigger code includes references to parent values: determining the row, within the view, in which the nested collection resides and, prior to executing the trigger code for the nested collection, binding the one or more references to one or more corresponding values that logically reside in the row.

32 Claims, 2 Drawing Sheets

DEFINING INSTEAD-OF TRIGGERS OVER NESTED COLLECTION COLUMNS OF VIEWS

FIELD OF THE INVENTION

The present invention relates to database systems and, more particularly, to defining instead-of triggers over nested collection columns of views.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A nested collection column of a table is a column that logically stores data items that belong to a collection data type. The collection of data items that logically reside within a row of a nested collection column is referred to as a nested collection. Nested collections may be ordered or unordered. Unordered nested collections are also referred to as nested tables. A table that has a nested collection column is referred to as the "parent table" of the nested collections that logically reside within the nested collection column.

Tables with nested collection columns can be created, for example, using a SELECT query and a CAST-MULTISET operator. For example, consider a department-employee scenario, where the table "emp" defines employee attributes and the table "dept" defines department attributes. Assume that these tables are defined as follows:

```
CREATE TABLE dept (
    deptno NUMBER PRIMARY KEY,
    deptname VARCHAR2 (20)
);
CREATE TABLE emp (
    empno NUMBER,
    empname VARCHAR2 (20),
    salary NUMBER,
    deptno NUMBER REFERENCES dept (deptno)
);
```

Given the above-listed definitions for the emp and dept tables, the CAST-MULTISET operator may be used to create instances of the "emp_list_t" type defined below, which represents a collection of the employee type "emp_t".

```
CREATE TYPE emp_t AS OBJECT (
    eno NUMBER,
    ename VARCHAR2 (20),
    salary NUMBER
);
/
CREATE TYPE emp_list_t AS TABLE OF emp_t;
/
```

Using the data types defined above, a table dept_emp may be created that has a row for each department, where the row for a particular department has one column for the department number, one column for department name, and one nested collection column that includes the names of all the employees that belong to the department.

```
CREATE TABLE dept_emp AS
    SELECT d.deptno, d.deptname,
        CAST (MULTISET (
            SELECT e.empno, e.empname, e.salary
            FROM emp e
            WHERE e.deptno = d.deptno
        ) AS emp_list_t) emplist
    FROM dept d;
```

Individual items in the nested collections of dept_emp can be modified using the TABLE( ) clause. For example, the following statement could be used to insert a row for "John" into the nested collection associated with the dept_emp table row for department 10:

```
INSERT INTO TABLE (select emplist FROM dept_emp
        WHERE deptno=10)
    VALUES (10, 'John', 78000);
```

In this statement, the SELECT statement within the TABLE( ) clause identifies a specific row of the parent table (the row associated with department number 10). By identifying a specific row in the parent table, the clause effectively identifies a specific instance of the nested collection. Having identified a specific instance of the nested collection, the database server is able to determine how the corresponding base table (emp) must be updated.

In many cases, it may not be desirable for all users to have access to the data in the salary column of the emplist collections. To implement a security policy that selectively limits access to columns, a table that contains sensitive information, such as the dept_emp table, is usually not made available for direct user access. Rather, the data would typically be made available through the use of one or more views.

VIEWS

A view is a logical table. As logical tables, views may be queried by users as if they were a table. However, views actually present data that is extracted or derived from existing tables. For security reasons, views are often used to provide users with access to a subset of the data that is actually stored in the database system. Columns that contain sensitive information may be included in the views made available to one set of users, and not included in the views made available to another set of users.

A view is defined by metadata referred to as a view definition. The view definition contains mappings to one or more columns in the one or more tables containing the data. Columns and tables that are mapped to a view are referred to herein as base columns and base tables of the view, respectively.

Typically, the view definition is in the form of a database query. For example, a view dept_view that has a row for each department, where the row for a particular department has one column for the department number, one column for department name, and one nested collection column that includes the names of all the employees that belong to the department, may be defined by the following statement:

```
CREATE VIEW dept_view AS
    SELECT d.deptno, d.deptname,
    CAST (MULTISET (
        SELECT e.empno, e.empname, e.salary
        FROM emp e
        WHERE e.deptno = d.deptno
    ) AS emp_list_t) emplist
FROM dept d;
```

A view that may be created in response to this definition is illustrated in FIG. 1. Each row of the dept_view has three columns. Within each row, the emplist column has a nested collection. In dept_view 100, each nested collection is a virtual table that contains three columns. The structure of dept_view 100 is dictated by its view definition. The data that populates dept_view 100 is the data that resides in the based tables used to generate dept_view 100.

One type of view that is generally not updateable is a view that is used to present data in the form of a virtual table with a nested collection column. The base data for the nested collections, and for the other columns of the virtual parent table that contains the nested collections, may actually have been gathered by the database server from multiple base tables. This characteristic of views with nested collections generally renders the views capable of being directly updated. However, other types of views that are not directly dateable may be rendered updateable through the use of a type of trigger that is known as an "instead-of" trigger.

TRIGGERS

In a database management system, a trigger is an object that specifies a series of actions to be automatically performed when a specific event occurs. According to industry standards, Data Manipulation Language (DML) statements are the events that cause user-defined triggers to be activated (or "fired"). For example, in a relational database, user-defined triggers may be designed to fire when a row of a database table or a table view is updated, inserted, or deleted. Accordingly, each user-defined trigger is typically associated with a single database table. That is, in a conventional database management system, the scope of the user-defined trigger is the table level of the database.

The series of actions specified by a trigger is typically written as instructions in a high-level database language such as SQL or PL/SQL (a procedural language extension of SQL available from Oracle Corporation of Redwood Shores, Calif.). In conformance with industry standards, these instructions must be able to access the data values of table columns corresponding to an affected row before the triggering DML statement was applied (the "old values") and after the modification was applied (the "new values").

Since triggers are objects, database customers can define, remove, and store triggers associated with a database table, and the database management system keeps track of which triggers have been defined for which table by storing that information as metadata (information about data) associated with the table in a data dictionary for the database. Consequently, triggers enable database customers to implement additional functionality in their databases for such purposes as enforcement of business rules and security.

A trigger is defined by a database server in response to receiving a request to create a trigger. For example, consider the following SQL statement issued by a user:

Create Trigger TR_AFTER_EMPLOYEE After Update on FORMER_EMPLOYEE {ONE OR MORE BLOCKS OF CODE};

A statement issued for the purpose of defining a trigger is referred to as a trigger creation statement. In response to receiving the above trigger creation statement, the database server defines the trigger by adding to the data definition a trigger definition as specified by the SQL statement. In this example, the SQL statement specifies that a trigger named TR_AFTER_EMPLOYEE is to be invoked after the database server performs a direct update on relational table FORMER_EMPLOYEE.

The {ONE OR MORE BLOCKS OF CODE} represent instructions associated with TR_AFTER_EMPLOYEE. The instructions are executed whenever the trigger is invoked. The database server is able to execute instructions represented by block(s) of code. The block(s) of code may include, for example, code for updating an audit table, or for calling other procedures and functions.

INSTEAD-OF TRIGGERS

An "instead-of trigger" enables a database server to indirectly modify a database in response to requests to modify data through certain types of views that are not inherently modifiable. An instead-of trigger is a trigger that is invoked in response to a request to modify the database through a view associated with the instead-of-trigger, such as a request to perform an update, insert, or delete operation upon a view. When a database server receives a request to modify a view, and an instead-of trigger is defined for the view, the database server invokes the instead-of trigger and foregoes any attempt to perform any direct modification operation itself.

Using conventional instead-of triggers, it is possible to perform DML operations on the data items within the virtual parent table of a view that contains a nested collection column. For example, an instead-of trigger may be defined over dept_view to insert, delete, or modify rows of dept_view. Such an instead-of trigger would fire once for each row of dept_view that a DML statement attempts to modify. Because each nested collection in the emplist column of dept_view is a data item within the virtual parent table, an instead-of trigger defined over dept_view may be used to manipulate the nested collection as an atomic data item.

Unfortunately, such an instead-of trigger cannot efficiently handle DML operations that target individual elements of nested collections. For example, if an update merely required the addition of an element to the collection item of a row, that operation could be handled by a conventional instead-of trigger designed to delete the entire collection object of the row and re-insert a new collection object that includes all of the original elements plus the element to be inserted.

Unfortunately, using an instead-of trigger to delete and recreate entire collection items incurs an amount processing overhead that can be hugely disproportional to the actual act being performed. For example, the insertion of a single element in a million-element collection item would cause the entire recreation of the million-element collection item. Unfortunately, conventional database systems do not provide any mechanism by which instead-of triggers can directly access and manipulate the individual rows within nested collections that are defined by views.

Based on the foregoing, it is desirable to provide a technique by which DML operations may be performed on individual data items within nested collections that logically reside within nested collection columns of views.

SUMMARY OF THE INVENTION

Techniques are provided for updating data that logically resides in one or more nested collections in a nested collection column of a view. According to one technique, a Data Manipulation Language (DML) statement that operates on individual elements within the one or more nested collections is detected. Instead of executing the DML statement, trigger code is executed once for each individual element, within the one or more nested collections, that is targeted by the DML statement. In addition, the trigger code may include one or more references to parent values. For each nested collection selected by the DML statement, the following steps are performed when the trigger code includes references to parent values: determining the row, within the view, in which the nested collection resides and, prior to executing the trigger code for the nested collection, binding the one or more references to one or more corresponding values that logically reside in the row.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
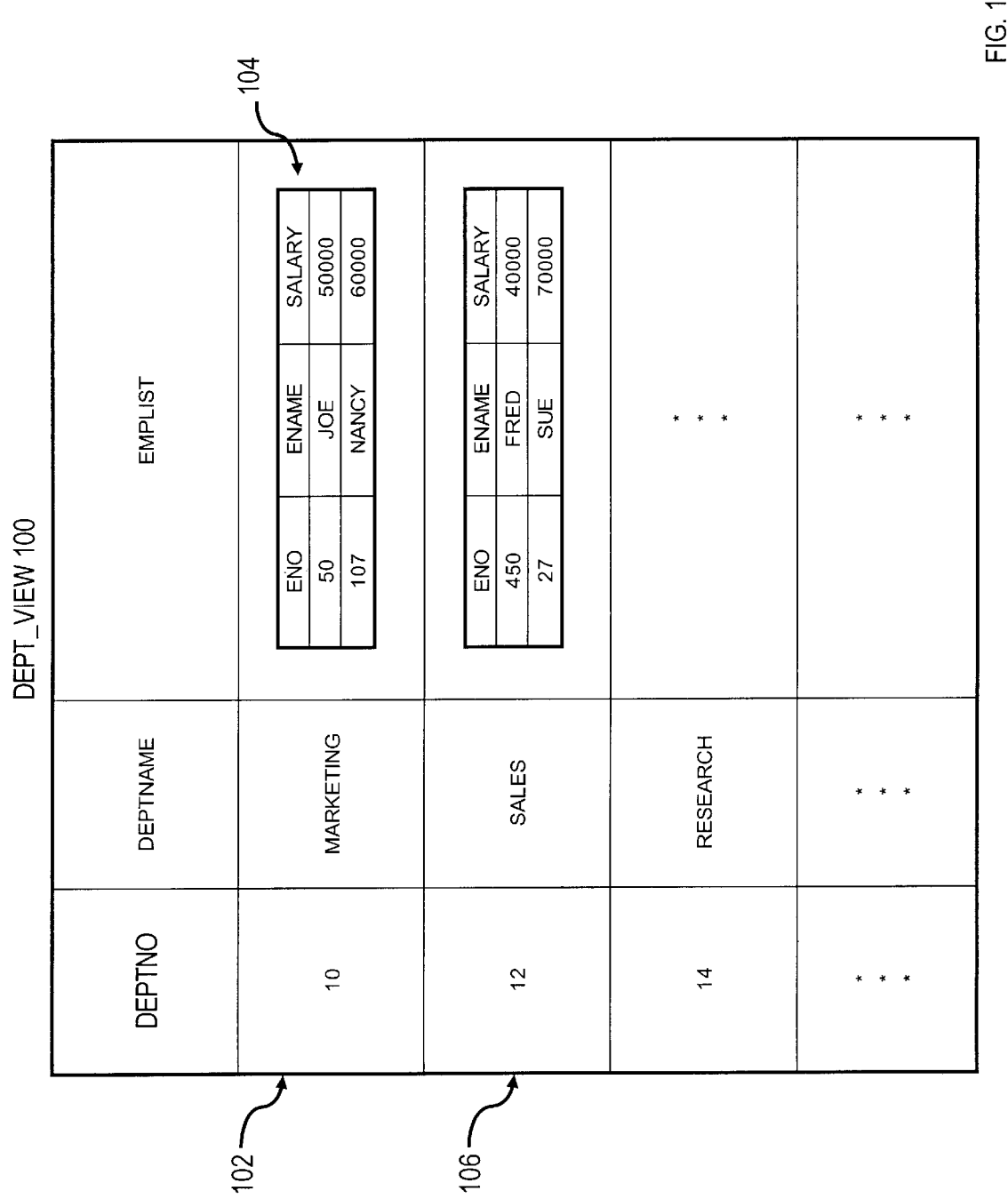
FIG. 1 is a block diagram illustrating a view with a nested collection column.

A method and apparatus for modifying views that contain nested key columns are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

Techniques are provided that allow DML operations to be performed on individual items within nested collection columns of views. According to one aspect of the invention, a mechanism is provided to allow users to define instead-of triggers over nested collections, as opposed to defining them over the parent tables within which the nested collections reside. Further, mechanisms are provided to allow instead-of triggers that are defined over nested collection columns to access certain data that may be required by the instead-of triggers to appropriately respond to DML operations that target such nested collections.

QUERIES THAT TARGET NESTED COLLECTIONS DEFINED BY VIEWS

According to one embodiment, techniques are provided to allow users to define instead-of triggers that will fire when an attempt is made to add, delete or modify data from a nested collection defined by a view. The following statement (Q1) is an example of the type of query that could be handled by such instead-of triggers:

(Q1) INSERT INTO TABLE(SELECT emplist FROM dept_view WHERE deptno=10) VALUES (200, 'Jack', 89999);

This query attempts to insert a row, through the view dept_view, into a nested collection. The specific nested collection into which the row is to be inserted is the nested collection contained in the emplist column of the dept_view row for the department with deptno=10. The row to be inserted has values for each field of the nested collection. In the present example, each element in the nested collection is an emp_t object. Consequently, each element of the nested collection has fields eno, ename, and salary. Query Q1 attempt to insert a row where the values 200, 'Jack', and 89999 are respectively supplied for the fields eno, ename, and salary.

DEFINING INSTEAD-OF TRIGGERS FOR NESTED COLLECTIONS DEFINED BY VIEWS

According to one aspect of the invention, the syntax for defining triggers has been extended to allow trigger creators to define triggers for nested collections defined by views. According to one embodiment, the trigger definition syntax has been extended to allow instead-of triggers to be defined as illustrated by the following definition (D1):

(D1) CREATE TRIGGER emp_tr INSTEAD OF INSERT
ON NESTED TABLE emplist OF dept_view FOR EACH ROW BEGIN
/* code for inserting values into the emp table in response to queries that attempt */
/* to insert rows into a nested collection of dept_view */
END;

This trigger definition specifies the view "dept_view", and the nested table column "emplist" within the view for which the trigger is to be created. Definition D1 also specifies that the trigger is "instead of insert". Consequently, the trigger will be fired in response to queries (such as Q1) that attempt to insert data into a collection that is nested in the emplist column of dept_view.

PROVIDING ACCESS TO DATA REQUIRED BY INSTEAD-OF TRIGGERS FOR NESTED COLLECTIONS DEFINED BY VIEWS

As mentioned above, instead-of triggers are triggers that are fired when a statement attempts to perform a DML operation on a view. The operations specified in instead-of triggers are performed "instead of" the DML operations specified in the statements. Statements that cause the firing of an instead-of trigger are referred to herein as "intercepted statements".

In the body of an instead-of trigger, the trigger creator typically specifies DML operations on base tables that, in effect, perform the DML operations that are requested by intercepted statements. However, in order to create code that specifies the appropriate DML operations, the trigger creator has to be able to refer to certain values that are known only at the time a query is intercepted.

For example, a query may specify the insertion into a view of a row that includes a particular set of values. To accurately simulate the operation specified in the query, the code within the trigger must, for example insert into a base table of the view a row that includes the values specified in the query. In order for the trigger code to perform the required action, the code must be able to refer to the not-yet-supplied values that will be supplied in the intercepted statements.

To facilitate the creation of instead-of trigger code for DML operations, conventional trigger implementations allow trigger creators to use OLD and NEW qualifiers in the body of the trigger.

However, the OLD and NEW qualifiers do not make available all of the information required to create the trigger body for instead-of triggers for nested collections defined by views. For example, the body of trigger D1 could be:

INSERT INTO emp
    VALUES(:NEW.eno, :NEW.ename, :NEW.salary);

Assume that this trigger code is executed in response to intercepting query Q1. The values supplied by query Q1 would be used to replace the NEW qualifiers in the trigger body to produce the statement:

INSERT INTO emp
    VALUES(200, 'Jack', 89999);

Unfortunately, this statement is deficient because the statement does not supply a value for each of the columns of emp. Specifically, the emp table has a deptno column, in addition to the empno, empname and salary columns, and the statement does not supply a value for the deptno column. To overcome this deficiency, a trigger creator may attempt to supply the necessary deptno value by specifying a trigger body as follows:

INSERT INTO emp
    VALUES(:NEW.eno, :NEW.ename, :NEW.salary, :NEW.deptno);

However, this statement will fail because term NEW.deptno implies that the intercepted statement supplies a deptno value in its VALUES clause. However, query Q1 does not supply any such value in its VALUES clause because the VALUES clause only specifies values that correspond to the fields of the nested collection, and the nested collection "emplist" has no deptno column.

All of the rows within any given nested emplist are associated with the same deptno, and that deptno value is stored in the deptno column of the dept_view row in which the emplist is nested. For example, assume that dept_view contains the values illustrated in FIG. 1. Row 102 of dept_view 100 has the deptno value 10, which is the deptno associated with all of the employees listed in the emplist of row 102 (emplist 104).

Consequently, if the trigger code for the instead-of trigger for the emplist column were able to access the values in the deptno column of dept_view 100, then the trigger code would be able to respond to attempts to insert values into an emplist collection by performing the appropriate insert into the emp table. According to one embodiment, access to the values contained in the parent table row that contains a nested collection is provided using a PARENT qualifier. Syntactically, the PARENT qualifier is used within the body of an instead-of trigger in a manner similar to the NEW and OLD qualifiers. For example, the trigger body of D1 may be specified using the following statement:

INSERT INTO emp
    VALUES(:NEW.eno, :NEW.ename, :NEW.salary, :PARENT.deptno);

When this statement is executed in response to interception of query Q1, the parameters of the VALUES clause are replaced accordingly to produce the following statement:

INSERT INTO emp
    VALUES(200, 'Jack', 89999,10);

In the present example, the values 200, 'Jack', and 89999 are extracted from the VALUES clause of the intercepted statement Q1, while the value 10 is the value of the deptno column of the row (row 102) that contains the nested collection (emplist 104) into which the intercepted statement Q1 is attempting to insert values.

FIRE-TIME RESOLUTION OF REFERENCES IN TRIGGER CODE

When an instead-of trigger includes code with references associated with qualifiers NEW, OLD or PARENT, those references must be bound to the appropriate values at the time the instead-of trigger is fired. Thus, upon firing an instead-of trigger, the database server (1) determines the appropriate values for the references associated with qualifiers contained in the body of the trigger, (2) binds the references to the appropriate values, and (3) executes the trigger code for each element on which the intercepted statement operates.

In general, the appropriate values to bind to the references associated with the NEW qualifier may be extracted from the VALUE clause of the intercepted statements. However, in the context of collections nested in views, the fire-time handling of trigger code that has references associated with the PARENT qualifier and the OLD qualifier is more complicated.

THE PARENT QUALIFIER

According to one embodiment, the appropriate values to bind to references associated with the PARENT qualifier are determined by executing the subquery contained in the TABLE clause of the intercepted statement. The row of the view that is selected by TABLE clause subquery is the row that contains the values that are to be bound to the PARENT qualifiers.

For example, the TABLE clause of query Q1 contains the subquery: SELECT emplist FROM dept_view WHERE deptno=10. Executing this query results in the selection of row 102 of dept_view 100. Consequently, the database server binds the values within row 102 to the appropriate PARENT qualifiers within the trigger definition. Thus, references within the trigger definition to :PARENT.deptno and : PARENT.deptname would be respectively bound to the values 10 and Marketing.

In the present example, the subquery "SELECT emplist FROM dept_view WHERE deptno=10" selects a single row of view dept_view 100. However, the subquery contained in a TABLE clause of an intercepted statement may actually select many view rows. Under those conditions, the process of binding the PARENT references is performed once for each such row prior to performing the DML operations on elements that belong to the collection that logically resides in the row.

For example, if the TABLE clause subquery of Q1 were "SELECT emplist FROM dept_view WHERE (deptno=10) or (deptname='sales')", then execution of the subquery would select both rows 102 and 106. When the trigger code executes to insert elements into the emplist for row 102, references to :PARENT.deptno and :PARENT.deptname would be respectively bound to the values 10 and 'Marketing'. When the trigger code executes to insert elements into the emplist for row 106, references to :PARENT.deptno and :PARENT.deptname would be respectively bound to the values 12 and 'Sales'.

THE OLD QUALIFIER

The OLD qualifier is bound to the values that a row contained before the row was modified by an UPDATE statement. According to one embodiment, in the context of an UPDATE of a nested collection defined by a view, the appropriate values to bind to references associated with the OLD qualifier are determined by executing the subquery contained in the TABLE clause of the intercepted statement. Executing the subquery identifies the set of rows in the view that contain nested collections against which to execute the code of the trigger. For each of the nested collections thus identified, the UPDATE predicate of the intercepted statement is compared against each of the elements. Those elements that satisfy the UPDATE predicate of the intercepted statement are updated, and values that existed within those elements prior to the UPDATE are bound to the corresponding references associated with the OLD qualifier.

NON-RELATIONAL SOURCES FOR NESTED COLLECTIONS

In the examples given above, the data used to populate nested collections originates from base tables. However, the actual source of collection data need not be a relational table. For example, the source of collection data may be a large binary object (LOB), where routines are supplied for inserting, modifying or deleting individual data items from within the LOB. Thus, the present invention is not limited to collections that are constructed with data from any particular type of data source.

HARDWARE OVERVIEW

Figure 2:
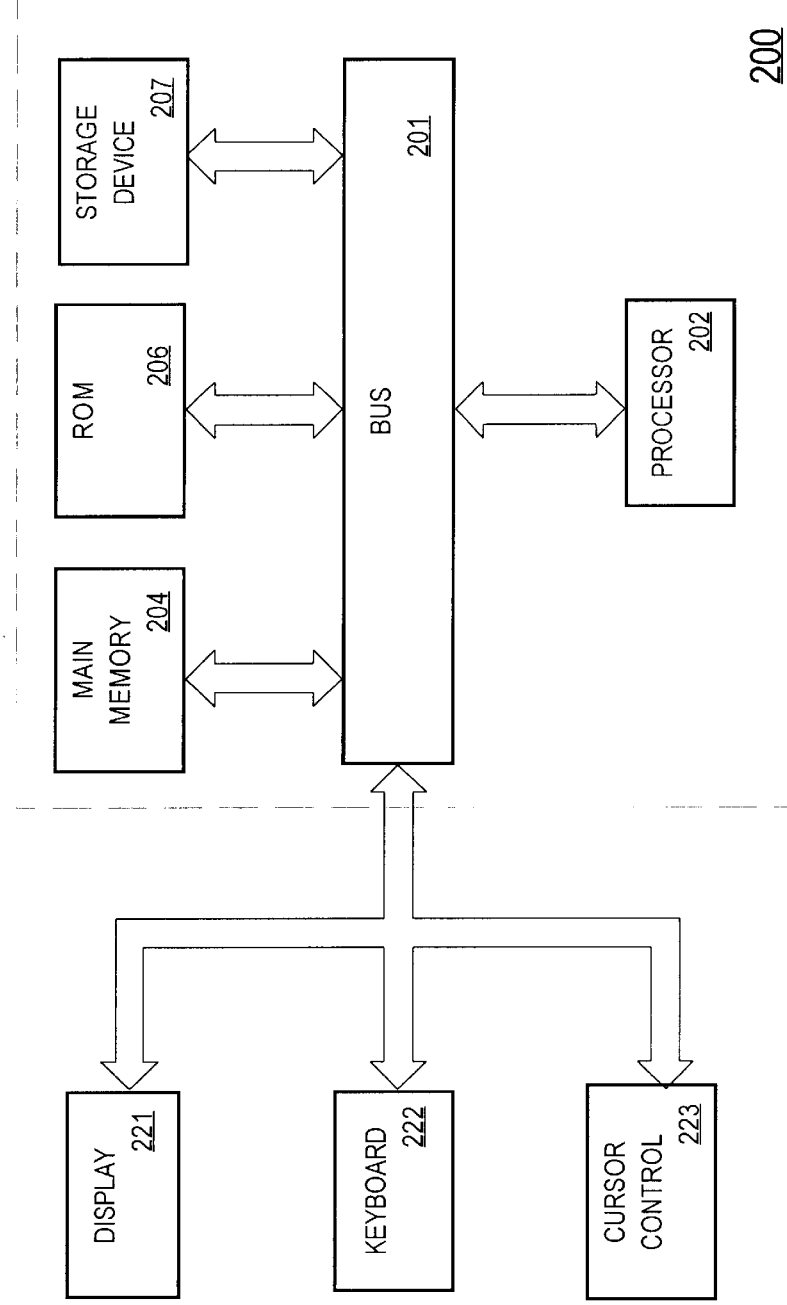
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for modifying nested collections that logically reside in a column of a view, the method comprising the steps of:

receiving a definition of an instead-of trigger to be fired in response to attempts to modify nested collections in said column of said view;

detecting an attempt to perform a modification to a nested collection in said column of said view; and in response to detecting the attempt to perform a modification to a nested collection in said column of said view, executing code contained in the instead-of trigger for each element of said nested collection that said modification attempts to modify;

wherein said modification is performed for each element of said nested collection that said modification attempts to modify, rather than performed only on said nested collection as an atomic unit of data within said view.

2. The method of claim 1 wherein execution of said code modifies one or more base tables of said view to achieve said modification without first deleting said nested collection.

3. The method of claim 1 wherein the attempt to perform a modification is an attempt to insert one or more elements into said nested collection.

4. The method of claim 1 wherein the attempt to perform a modification is an attempt to delete one or more elements of said nested collection.

5. The method of claim 1 wherein the attempt to perform a modification is an attempt to modify values in one or more fields of one or more elements of said nested collection.

6. The method of claim 2 wherein execution of said code involves modifying values in a plurality of columns of said one or more base tables, wherein at least one column of said plurality of columns does not correspond to any field in said nested collection.

7. The method of claim 6 wherein:

said nested collection resides in a row of said view; and said code indicates that data for said at least one column is to be supplied from a column of said row other than the column in which said nested collection logically resides.

8. The method of claim 7 wherein said code uses a particular qualifier to refer to data from columns of said row.

9. The method of claim 1 wherein the step of detecting an attempt to perform a modification includes receiving a query that selects said nested collection for modification by specifying matching criteria for rows of said view, wherein the row that contains said nested collection satisfies said matching criteria.

10. The method of claim 9 wherein:

the row that contains said nested collection is one of a plurality of rows that satisfy said matching criteria; and the method further includes firing said instead-of trigger for each row of said plurality of rows that satisfy said matching criteria.

11. The method of claim 9 wherein:

said code includes variables; and the step of executing said code includes binding said variables to values contained in columns of said row other than said column.

12. The method of claim 10 wherein:

said code includes variables; and the step of firing said instead-of trigger for each row of said plurality of rows includes, for each row of said plurality of rows, binding said variables to values contained in columns of said row other than said column.

13. A method for updating data that logically resides in one or more nested collections in a nested collection column of a view, the method comprising the steps of:

detecting a Data Manipulation Language (DML) statement that operates on individual elements within said one or more nested collections; and instead of executing said DML statement on said one or more nested collections as atomic data item within said view, executing trigger code once for each individual element, within said one or more nested collections, that is targeted by said DML statement.

14. The method of claim 13 wherein:

the DML statement specifies collection selection criteria for selecting nested collections within said view; and the step of executing said trigger code once for each individual element includes executing said trigger code once for each individual element, within nested collections that satisfy said collection selection criteria, that is targeted by said DML statement.

15. The method of claim 14 wherein:

the DML statement specifies element selection criteria for selecting elements within nested collections; and the step of executing said trigger code once for each individual element includes executing said trigger code once for each individual element, within nested collections that satisfy said collection selection criteria, that satisfies said element selection criteria within said DML statement.

16. A method for responding to detection of a Data Manipulation Language (DML) statement that operates on individual elements within one or more nested collections that logically reside in a view, the method comprising the steps of:

identifying, within trigger code for a trigger, one or more references to parent values;

for each nested collection selected by said DML statement, performing the steps of determining a row, within said view, in which said nested collection resides; and prior to executing said trigger code for said nested collection, binding said one or more references to one or more corresponding values that logically reside in said row.

17. A computer-readable medium bearing instructions for modifying nested collections that logically reside in a column of a view, the instructions comprising instructions for performing the steps of:

receiving a definition of an instead-of trigger to be fired in response to attempts to modify nested collections in said column of said view;

detecting an attempt to perform a modification to a nested collection in said column of said view; and in response to detecting the attempt to perform a modification to a nested collection in said column of said view, executing code contained in the instead-of trigger for each element of said nested collection that said modification attempts to modify;

wherein said modification is performed for each element of said nested collection that said modification attempts to modify, rather than performed only on said nested collection as an atomic unit of data within said view.

18. The computer-readable medium of claim 17 wherein execution of said code modifies one or more base tables of said view to achieve said modification without first deleting said nested collection.

19. The computer-readable medium of claim 17 wherein the attempt to perform a modification is an attempt to insert one or more elements into said nested collection.

20. The computer-readable medium of claim 17 wherein the attempt to perform a modification is an attempt to delete one or more elements of said nested collection.

21. The computer-readable medium of claim 17 wherein the attempt to perform a modification is an attempt to modify values in one or more fields of one or more elements of said nested collection.

22. The computer-readable medium of claim 18 wherein execution of said code involves modifying values in a plurality of columns of said one or more base tables, wherein at least one column of said plurality of columns does not correspond to any field in said nested collection.

23. The computer-readable medium of claim 22 wherein: said nested collection resides in a row of said view; and said code indicates that data for said at least one column is to be supplied from a column of said row other than the column in which said nested collection logically resides.

24. The computer-readable medium of claim 23 wherein said code uses a particular qualifier to refer to data from columns of said row.

25. The computer-readable medium of claim 17 wherein the step of detecting an attempt to perform a modification includes receiving a query that selects said nested collection for modification by specifying matching criteria for rows of said view, wherein the row that contains said nested collection satisfies said matching criteria.

26. The computer-readable medium of claim 25 wherein: the row that contains said nested collection is one of a plurality of rows that satisfy said matching criteria; and the computer-readable medium further includes firing said instead-of trigger for each row of said plurality of rows that satisfy said matching criteria.

27. The computer-readable medium of claim 25 wherein: said code includes variables; and the step of executing said code includes binding said variables to values contained in columns of said row other than said column.

28. The computer-readable medium of claim 26 wherein: said code includes variables; and the step of firing said instead-of trigger for each row of said plurality of rows includes, for each row of said plurality of rows, binding said variables to values contained in columns of said row other than said column.

29. A computer-readable medium bearing instructions for updating data that logically resides in one or more nested collections in a nested collection column of a view, the instructions comprising instructions for performing the steps of:

detecting a Data Manipulation Language (DML) statement that operates on individual elements within said one or more nested collections; and instead of executing said DML statement on said one or more nested collections as atomic data item within said view, executing trigger code once for each individual element, within said one or more nested collections, that is targeted by said DML statement.

30. The computer-readable medium of claim 29 wherein: the DML statement specifies collection selection criteria for selecting nested collections within said view; and the step of executing said trigger code once for each individual element includes executing said trigger code once for each individual element, within nested collections that satisfy said collection selection criteria, that is targeted by said DML statement.

31. The computer-readable medium of claim 30 wherein: the DML statement specifies element selection criteria for selecting elements within nested collections; and the step of executing said trigger code once for each individual element includes executing said trigger code once for each individual element, within nested collections that satisfy said collection selection criteria, that satisfies said element selection criteria within said DML statement.

32. A computer-readable medium bearing instructions for responding to detection of a Data Manipulation Language (DML) statement that operates on individual elements within one or more nested collections that logically reside in a view, the instructions comprising instructions for performing the steps of:

identifying, within trigger code for a trigger, one or more references to parent values;

for each nested collection selected by said DML statement, performing the steps of determining a row, within said view, in which said nested collection resides; and prior to executing said trigger code for said nested collection, binding said one or more references to one or more corresponding values that logically reside in said row.

* * * * *